US008905005B2

(12) United States Patent
Shimura et al.

(10) Patent No.: US 8,905,005 B2
(45) Date of Patent: Dec. 9, 2014

(54) EVAPORATIVE FUEL TREATMENT APPARATUS FOR VEHICLE

(75) Inventors: Takeshi Shimura, Wako (JP); Takahiro Imamura, Wako (JP); Satoshi Okayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 13/434,603

(22) Filed: Mar. 29, 2012

(65) Prior Publication Data

US 2012/0247434 A1  Oct. 4, 2012

(30) Foreign Application Priority Data

Mar. 31, 2011 (JP) .................................. 2011-078424

(51) Int. Cl.
*F02M 25/08* (2006.01)
*B60K 15/035* (2006.01)

(52) U.S. Cl.
CPC .......... *F02M 25/089* (2013.01); *B60Y 2200/12* (2013.01); *B60K 15/03519* (2013.01); *B60K 2015/03514* (2013.01)
USPC .......................................... 123/520; 123/574

(58) Field of Classification Search
CPC ............................. F02M 33/04; F02M 25/08
USPC .......................................... 123/518–521, 574
See application file for complete search history.

(56) References Cited

U.S. PATENT DOCUMENTS

| 7,426,919 | B2 * | 9/2008 | Kano et al. ..................... 123/520 |
| 2001/0010219 | A1 * | 8/2001 | Isobe et al. ..................... 123/516 |
| 2002/0112702 | A1 * | 8/2002 | Weldon et al. ................ 123/520 |
| 2002/0184942 | A1 * | 12/2002 | Isobe et al. .................... 73/118.1 |
| 2003/0000294 | A1 * | 1/2003 | Yanase et al. ................ 73/118.1 |
| 2004/0129068 | A1 * | 7/2004 | Oki et al. ...................... 73/118.1 |
| 2004/0154596 | A1 * | 8/2004 | Mitani et al. .................. 123/509 |
| 2009/0133673 | A1 * | 5/2009 | Amano et al. ................ 123/520 |
| 2012/0199773 | A1 * | 8/2012 | Miura ....................... 251/129.15 |

FOREIGN PATENT DOCUMENTS

JP  4-362244 A  12/1992

* cited by examiner

*Primary Examiner* — John Kwon
*Assistant Examiner* — Johnny H Hoang
(74) *Attorney, Agent, or Firm* — Birch, Stewart, Kolasch & Birch, LLP (57) ABSTRACT

An evaporative fuel treatment apparatus for a vehicle includes a direct purge channel for supplying evaporative fuel to a purge channel without involving a canister; a purge control valve for controlling communications between the canister and an air-intake system of an internal combustion engine by an opening and closing operation; a direct purge control valve for controlling communications between a fuel tank and the air-intake system by another opening and closing operation; and a two-way valve provided in a charge channel. During a purge mode of the apparatus, evaporative fuel adsorbed in the canister is purged to the air-intake system by closing the direct purge control valve and opening the purge control valve during operation of engine. During a direct purge mode of the apparatus, evaporative fuel in the fuel tank is purged to the air-intake system by closing the purge control valve and opening the direct purge control valve.

20 Claims, 4 Drawing Sheets

EVAPORATIVE FUEL TREATMENT APPARATUS FOR VEHICLE

CROSS-REFERENCE TO RELATED APPLICATION

The present application claims priority under 35 U.S.C. §119 to Japanese Patent Application No. 2011-078424, filed Mar. 31, 2011. The entire contents of the above-identified application is hereby incorporated by reference.

BACKGROUND OF THE INVENTION

1. Field of the Invention

The present invention relates to an evaporative fuel treatment apparatus for a vehicle such as a motorcycle.

2. Description of Background Art

In the related art, a technology of introducing evaporative fuel stored in a canister into an internal combustion engine and burning the same is known (for example, see JP-A-4-362244).

Incidentally, in the evaporative fuel treatment apparatus described above, there is a problem of increase in the size of a canister if an attempt is made to secure a sufficient capacity of the canister which allows storage of evaporative fuel generating in a fuel tank. Also, if the change in concentration of the evaporative fuel is high, there is a problem in that a complex correction formula is required for injection control and amount-of-purge control when introducing the evaporative fuel into an air-intake system according to the operating state of a vehicle.

In view of such circumstances, it is an object of the present invention to provide an evaporative fuel treatment apparatus for a vehicle which inhibits increase in the size of a canister and allows easy introduction of evaporative fuel into an air-inlet system without the necessity of complex correction.

SUMMARY AND OBJECTS OF THE INVENTION

In order to solve the above-described problem, an embodiment of the evaporative fuel treatment apparatus of the present invention includes a fuel tank configured to store fuel therein; a canister having an absorbent filled therein and configured to adsorb and store the evaporative fuel; a charge channel configured to communicate the fuel tank and the canister; a purge channel configured to communicate the canister and an air-intake system of an internal combustion engine; and an atmospheric air release channel configured to communicate the canister and the outside.

In addition, the apparatus includes a direct purge channel capable of supplying the evaporative fuel from the fuel tank to the purge channel without involving the canister; a purge control valve provided in the purge channel and configured to control the communicating state between the canister and the air-intake system of the internal combustion engine by an opening and closing operation; a direct purge control valve provided in the direct purge channel and configured to control the communicating state between the fuel tank and the air-intake system of the internal combustion engine by an opening and closing operation; and a two-way valve provided in the charge channel and configured to open at a predetermined pressure.

The apparatus also has a purge mode in which the evaporative fuel adsorbed in the canister is purged to the air-intake system of the internal combustion engine by bringing the direct purge control valve into a closed state and the purge control valve into an opened state while the internal combustion engine is in operation, and a direct purge mode in which the evaporative fuel in the fuel tank is purged to the air-intake system by bringing the purge control valve into a closed state and the direct purge control valve into an opened state.

In an embodiment of the present invention, the apparatus includes an $O_2$ sensor mounted on an exhaust system of the internal combustion engine and configured to detect the concentration of oxygen in exhaust air; an injector configured to inject the fuel supplied from the fuel tank; a vehicle speed sensor configured to detect the vehicle speed; and a control unit configured to determine the amount of injection of the injector on the basis of results of detection of the $O_2$ sensor and the vehicle speed sensor. The control unit is configured to start the purge mode when the internal combustion engine is activated and a predetermined vehicle speed is reached, reduce the amount of injection of the injector on the basis of the result of detection obtained by the $O_2$ sensor simultaneously with the start of the purge mode, start the direct purge mode when the concentration of oxygen is determined to be in excess of a predetermined concentration on the basis of the result of detection obtained by the $O_2$ sensor, determine that the purge by the canister and the direct purge by the evaporative fuel in the fuel tank are completed when the concentration of oxygen becomes in excess of the predetermined concentration again thereafter, and increases the amount of injection of the injector on the basis of the result of detection obtained by the $O_2$ sensor.

In an embodiment of the present invention, the apparatus includes an $O_2$ sensor mounted on an exhaust system of the internal combustion engine and configured to detect the concentration of oxygen in exhaust air; an injector configured to inject the fuel supplied from the fuel tank; a temperature sensor configured to detect the temperature of coolant for cooling the internal combustion engine; and a control unit configured to determine the amount of injection of the injector on the basis of results of detection of the $O_2$ sensor and the temperature sensor.

The control unit is configured to start the purge mode when the internal combustion engine is activated and the temperature of the coolant reaches a predetermined temperature, reduce the amount of injection of the injector on the basis of the result of detection obtained by the $O_2$ sensor simultaneously with the start of the purge mode, start the direct purge mode when the concentration of oxygen is determined to be in excess of the predetermined concentration on the basis of the result of detection obtained by the $O_2$ sensor, determine that the purge by the canister and the direct purge by the evaporative fuel in the fuel tank are completed when the concentration of oxygen becomes in excess of the predetermined concentration again thereafter, and increase the amount of injection of the injector on the basis of the result of detection obtained by the O2 sensor.

In an embodiment of the present invention, the direct purge channel is branched from the charge channel on the side of the fuel tank with respect to the two-way valve, and is merged with the purge channel on the side of the air-intake system of the internal combustion engine with respect to the purge control valve.

In an embodiment of the present invention the direct purge channel is merged and connected with the purge channel from a gas-phase portion of the fuel tank.

Advantages of the present invention include the following:

With the provision of the direct purge mode in which the evaporative fuel in the fuel tank is purged to the air-intake system in the internal combustion engine in addition to the purge mode in which the evaporative fuel adsorbed in the canister to the air-intake system of the internal combustion engine, volatile components of the fuel stored in the fuel tank can be purged during the operation of the internal combustion engine to reduce the volatile components in the fuel, thereby reducing the evaporative fuel generating when the internal combustion engine is not in operation such as while the vehicle is parked, so that an effect of inhibiting the increase in the size of the canister is achieved.

Also, since the evaporative fuel in the fuel tank can be purged to the air-intake system of the internal combustion engine directly by the direct purge mode without involving the canister, the change in concentration of the evaporative fuel when the canister is involved in the purge mode can be evened out by the evaporative fuel in the direct purge. Therefore, there is an advantage of being capable of purging the evaporative fuel in the fuel tank without performing a complex correction.

According to an embodiment of the present invention, since the evaporative fuel stored in the canister is purged to the air-intake system of the internal combustion engine by starting the purge mode when the vehicle speed detected by the vehicle speed sensor reaches the predetermined vehicle speed which provides stable combustion for the internal combustion engine for example, and, at that time, since the concentration of oxygen is increased with decrease of the fuel to be supplied to the air-intake system of the internal combustion engine, the amount of fuel injection of the injector is controlled to be decreased by an amount corresponding to the purged amount. Then, when the most part of the evaporative fuel stored in the canister is purged and the canister becomes almost empty and hence the amount of purge to the air-intake system of the internal combustion engine is lowered, the concentration of oxygen in the exhaust air is increased, and when the concentration of oxygen becomes in excess of the predetermined concentration, the direct purge mode is started.

The evaporative fuel in the fuel tank is purged to the air-intake system of the internal combustion engine directly by the direct purge mode, and the concentration of oxygen in the exhaust air is lowered. Then, when the most part of the evaporative fuel in the fuel tank is purged and the fuel tank becomes almost empty and hence the amount of purge to the air-intake system of the internal combustion engine is lowered and again the concentration of the oxygen in the exhaust air is increased and becomes in excess of the predetermined concentration, it is determined that the direct purge is completed and the amount of injection of the injector is increased. Therefore, by switching the mode between the purge mode and the direct purge mode on the basis of the results of detection obtained by the vehicle speed sensor and the $O_2$ sensor, the evaporative fuel in the canister and the fuel tank can be purged to the air-intake system of the internal combustion engine without performing the complex control in comparison with the case where all the evaporative fuel is purged via the canister. Also, since the evaporative fuel in the fuel tank is purged during the travel, the evaporative fuel in the fuel tank when the internal combustion engine is not in operation such as while the vehicle is parked can be reduced, so that the canister can advantageously be reduced in size.

According to an embodiment of the present invention, since the evaporative fuel stored in the canister is purged to the air-intake system of the internal combustion engine by starting the purge mode when the temperature detected by the temperature sensor reaches the predetermined temperature which provides stable combustion for the internal combustion engine for example, and, at that time, since the concentration of oxygen is increased with decrease of the fuel to be supplied to the air-intake system of the internal combustion engine, the amount of fuel injection of the injector is controlled to be decreased by an amount corresponding to the purged amount. Then, when the most part of the evaporative fuel stored in the canister is purged and the canister becomes almost empty and hence the amount of purge to the air-intake system of the internal combustion engine is lowered, the concentration of oxygen in the exhaust air is increased, and when the concentration of oxygen becomes in excess of the predetermined concentration, the direct purge mode is started.

The evaporative fuel in the fuel tank is purged to the air-intake system of the internal combustion engine directly by the direct purge mode, and the concentration of oxygen in the exhaust air is lowered. Then, when the most part of the evaporative fuel in the fuel tank is purged and the fuel tank becomes almost empty and hence the amount of purge to the air-intake system of the internal combustion engine is lowered and then the concentration of the oxygen in the exhaust air is increased and becomes in excess of the predetermined concentration, it is determined that the direct purge is completed and the amount of injection of the injector is increased. Therefore, by switching the mode between the purge mode and the direct purge mode on the basis of the results of detection obtained by the temperature sensor and the $O_2$ sensor, the evaporative fuel in the canister and the fuel tank can be purged to the air-intake system of the internal combustion engine without performing the complex control in comparison with the case where all the evaporative fuel is purged via the canister. Also, since the evaporative fuel in the fuel tank is purged during the travel, the evaporative fuel in the fuel tank when the internal combustion engine is not in operation such as while the vehicle is parked can be reduced, so that the canister can advantageously be reduced in size.

According to an embodiment of the present invention, there is an advantage that since the evaporative fuel in the fuel tank can be supplied to the air-intake system of the internal combustion engine via the charge channel, the direct purge channel, and the purge channel, the length of the channel can be reduced, and hence the weight reduction is achieved.

According to an embodiment of the present invention, air to be taken from the atmospheric air release channel can be supplied to the gas-phase portion of the fuel tank via the charge channel, so that the volatile component of the fuel in the fuel tank can be purged by causing the same to be evaporated more positively, there is an advantage in that the evaporative fuel generating when the internal combustion engine is not in operation such as while the vehicle is parked can be reduced, and hence further reduction in the size of the canister is enabled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to the drawings, an embodiment of the present invention will be described.

Figure 1:
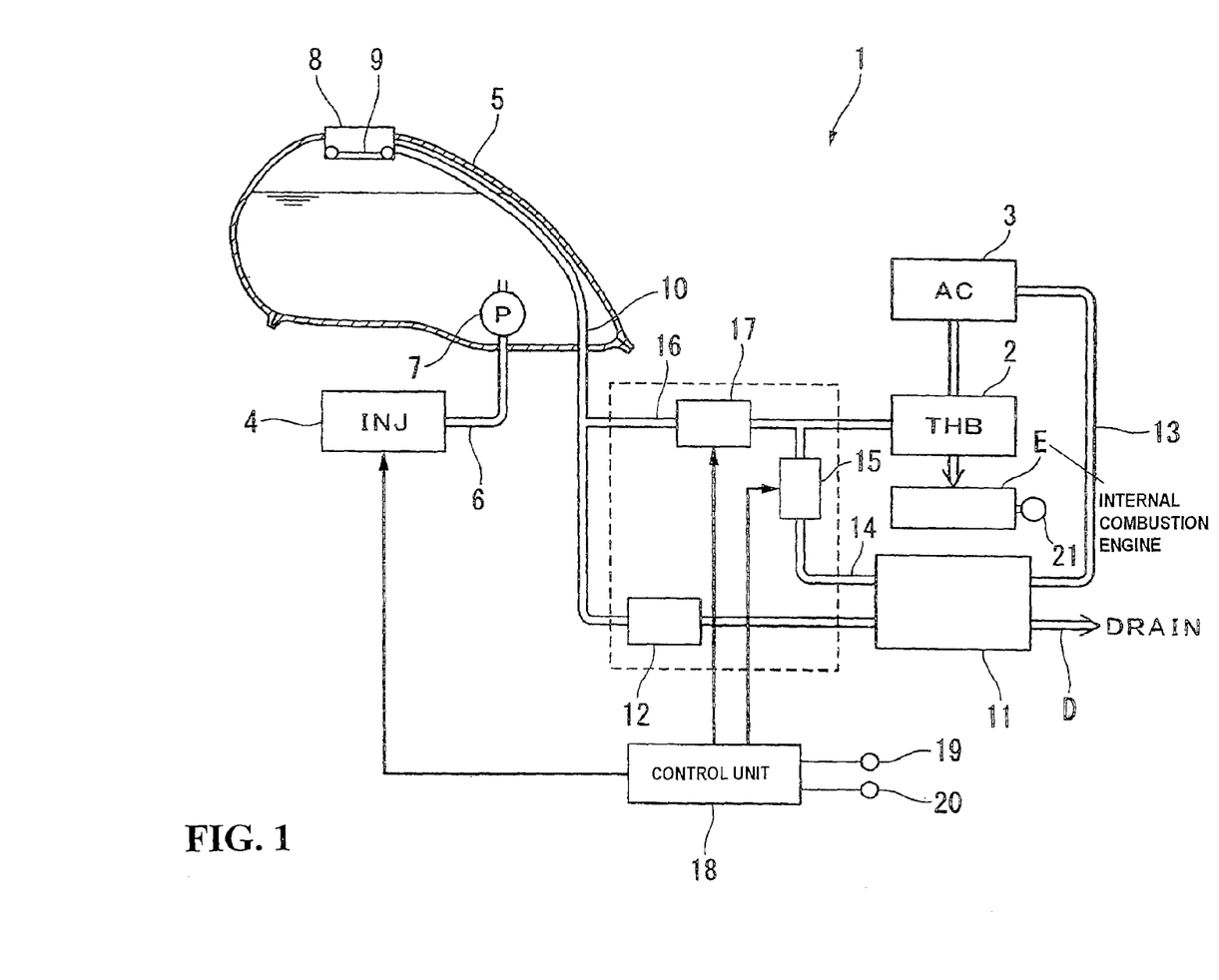
FIG. 1 is a schematic configuration drawing showing an evaporative fuel treatment apparatus for a vehicle according to an embodiment of the present invention.

FIG. 1 shows a schematic configuration of an evaporative fuel treatment apparatus 1 in this embodiment. The evaporative fuel treatment apparatus 1 is mounted on a saddle-type vehicle such as a motorcycle, and the motorcycle includes an internal combustion engine E for traveling mounted thereon. The internal combustion engine E receives supply of outside air introduced from an air cleaner box (AC) 3 via a throttle body (THB) 2 which constitutes an air-intake system, while an injector 4 as a fuel ejecting apparatus is mounted and the fuel is injected into a combustion chamber in the internal combustion engine E by the injector 4.

One end of a fuel supply channel 6 which supplies fuel from a fuel tank 5 in which fuel such as gasoline is stored is connected to the injector 4. The other end of the fuel supply channel 6 is connected to a fuel pump 7 mounted to the interior of the fuel tank 5. When the fuel pump 7 is driven, the liquid fuel in the fuel tank 5 is pumped toward the injector 4 via the fuel supply channel 6.

A fuel filler cap 8 is attached to an opening on an upper portion of the fuel tank 5 so as to be openable and closable, and vapor-liquid separating means 9 configured to separate gas phase, which is evaporated fuel, and liquid phase, which is fuel not evaporated, by a labyrinth structure or the like is integrally mounted to the fuel filler cap 8. The vapor-liquid separating means 9 is formed, for example, into an annular shape, and an end of a charge channel 10 is connected to a gas-phase portion to which only the evaporative fuel is introduced. The charge channel 10 is a channel which communicates the fuel tank 5 and a canister 11 in which the evaporative fuel is stored, and a two-way valve 12 configured to be opened at a predetermined pressure is arranged at a midsection thereof.

Connected respectively to the canister 11 are an atmospheric air release channel 13 communicating the canister 11 and the air cleaner box 3 and released to the atmospheric air via the air cleaner box 3, a drain (DRAIN) channel D configured to drain liquid fuel flowing into the canister 11, and a purge channel 14 communicating the canister 11 and the throttle body 2. A purge control valve 15 configured to open and close the communicating state between the canister 11 and the throttle body 2 according to a control signal from a control unit 18 is arranged in the purge channel 14.

The canister 11 includes an adsorbent such as active charcoal in the interior thereof. When gas containing evaporative fuel with relatively high concentration is introduced therein via the charge channel 10, the canister 11 adsorbs the evaporative fuel included in this gas into the adsorbent and stores the same therein and, on the other hand, when the atmospheric air with very low concentration of the evaporative fuel is introduced from the air cleaner box 3 due to an induction manifold depression in association with the start of the internal combustion engine E, the evaporative fuel treatment apparatus 1 discharges the evaporative fuel adsorbed in the adsorbent.

One end of a direct purge channel 16 is branched and connected to the charge channel 10 on the side of the fuel tank 5 with respect to the two-way valve 12. The other end of the direct purge channel 16 is merged with and connected to the purge channel 14 on the side of the throttle body 2 with respect to the purge control valve 15. In a midsection of the direct purge channel 16, a direct purge control valve 17 configured to open and close the communicating state between the fuel tank 5 and the throttle body 2 according to the control signal from the control unit 18 is arranged.

The purge control valve 15 and the direct purge control valve 17 are control valves for controlling the pressure respectively, and a pressure control solenoid valve or the like can be used, for example. Although the case where the direct purge channel 16 is provided so as to bypass a portion between the charge channel 10 and the purge channel 14 has been described, a portion surrounded by a broken line in FIG. 1 may be formed integrally into a unit. Also, the portion surrounded by the broken line in FIG. 1 is not limited to the configuration as described above as long as the communication from the fuel tank 5 to the canister 11, from the fuel tank 5 to the throttle body 2, and from the canister 11 to the throttle body 2 are selectable and, for example, a three-way valve may be employed.

An $O_2$ sensor 19 configured to detect the concentration of oxygen in the exhaust air from the internal combustion engine E and an vehicle speed sensor 20 configured to detect the vehicle speed are connected to the control unit 18, and the control unit 18 receives inputs of results of detection obtained by the $O_2$ sensor 19 and the vehicle speed sensor 20, respectively. Furthermore, the injector 4 described above is connected to the control unit 18, and the control unit 18 performs feedback control of the amount of injection of the injector 4 so that the amount of oxygen falls within a predetermined range on the basis of the result of detection obtained by the $O_2$ sensor 19.

The control unit 18 is configured to be capable of executing a purge mode in which the evaporative fuel stored in the canister 11 is purged to the throttle body 2 by bringing the direct purge control valve 17 into a closed state and the purge control valve 15 into an opened state while the internal combustion engine E is in operation, and a direct purge mode in which the evaporative fuel in the fuel tank 5 is purged to the throttle body 2 directly by bringing the purge control valve 15 into the closed state and the direct purge control valve 17 into the opened state, respectively.

The evaporative fuel treatment apparatus 1 in this embodiment has the configuration as described above. Referring now to a flowchart in FIG. 2, a control process performed by the control unit 18 of the evaporative fuel treatment apparatus 1 will be described. In an initial state in which the ignition is OFF, the purge control valve 15 and the direct purge control valve 17 described above are in the closed state.

Figure 2:
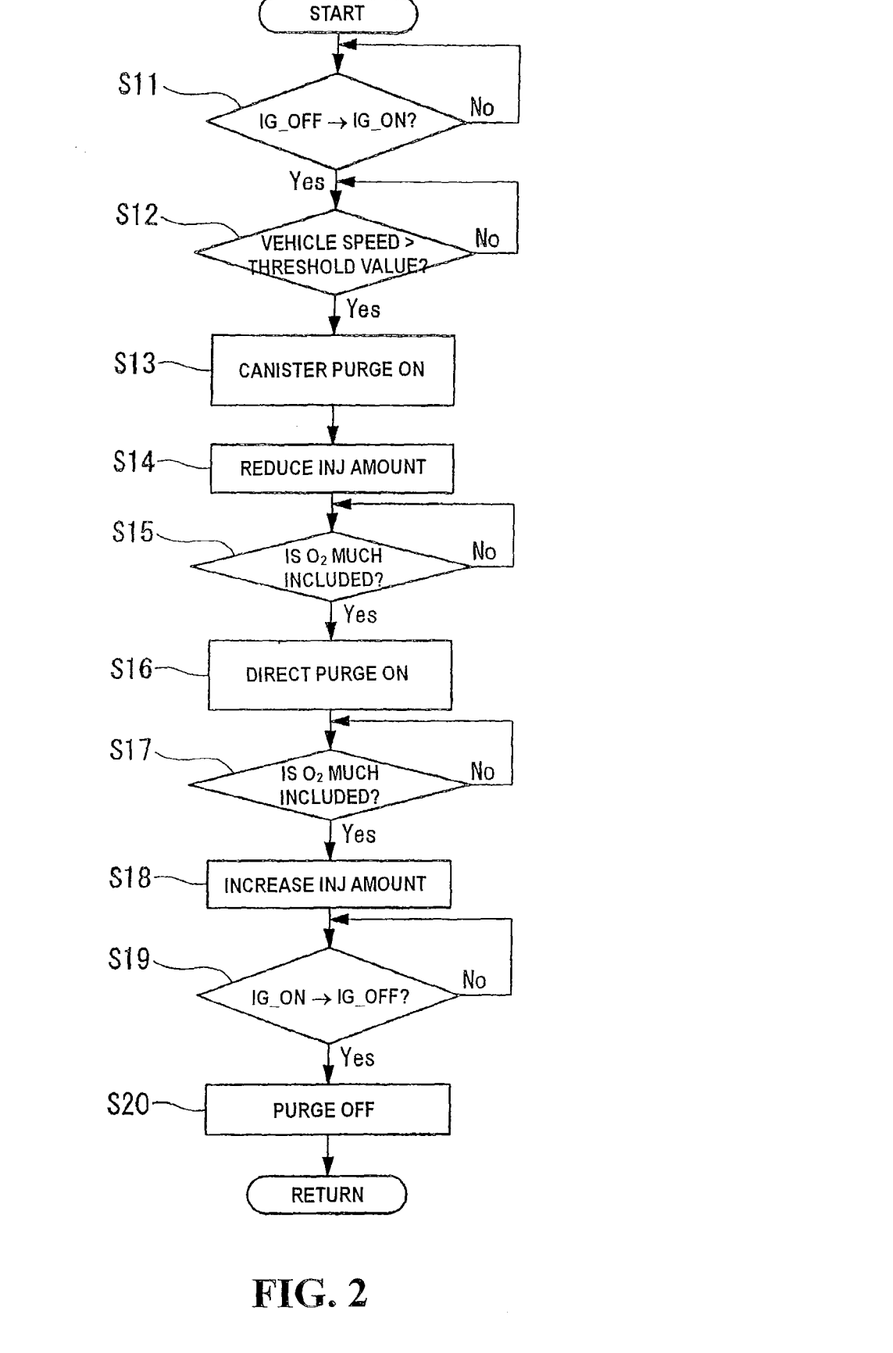
FIG. 2 is a flowchart of a control process executed by a control unit of the evaporative fuel treatment apparatus.

When the ignition is turned ON (IG_ON) from the parking state (IG_OFF) where the internal combustion engine E is not operated and the internal combustion engine E is started (Yes in Step S11), whether or not the vehicle speed detected by the vehicle speed sensor 20 is larger than a predetermined vehicle speed (a threshold value) set in advance for determining a stable combustion of the internal combustion engine E is determined (Step S12). When it is determined to be larger than the vehicle speed as a result of this determination, that is, when the vehicle speed reaches the predetermined vehicle speed (Yes in Step S12), the purge mode to open the purge control valve 15 is executed (ON) to purge the evaporative fuel stored in the canister 11 to the throttle body 2 (Step S13). The direct purge control valve 17 is kept in the closed state without being changed from the initial state.

When the purge mode is started, the evaporative fuel is added to the intake air of the internal combustion engine E. Therefore, the air-to-fuel ratio is changed and hence the concentration of oxygen included in the exhaust air is changed, so that the amount of fuel injection (liquid-phase) by the injector 4 (INJ) is reduced in comparison with the amount of injection when the purge is not performed by an amount corresponding to the addition of the evaporative fuel to the intake air so that the concentration of oxygen falls within a range adequate to the operation of the internal combustion engine E (Step S14).

Subsequently, whether or not the concentration of oxygen is increased (larger) is determined on the basis of the result of detection obtained by the $O_2$ sensor 19 (Step S15). More specifically, whether or not the concentration of oxygen detected by the $O_2$ sensor 19 exceeds a predetermined concentration (a threshold value) set in advance is determined. Here, when the remaining amount of the evaporative fuel stored in the canister 11 becomes small because of being purged, the fuel supplied to the internal combustion engine E is rarefied, and the concentration of oxygen included in the exhaust air tends to increase. In other words, the determination described above determines the fact that the remaining amount of the evaporative fuel stored in the canister 11 has become small on the basis of the result of detection obtained by the $O_2$ sensor 19. When it is set to control the amount of fuel injection of the injector 4 according to the concentration of oxygen during the purge from the canister 11, the increase of the concentration of oxygen hits the peak. In this case, however, the remaining amount of the evaporative fuel in the canister 11 can be determined according to the extent of control of increase of the amount of fuel injection.

When the concentration of oxygen exceeds the predetermined concentration as a result of determination described above, that is, when the concentration of oxygen is determined to have increased (Yes in Step S15), the purge control valve 15 is closed and the direct purge control valve 17 is opened to start (turn ON) the direct purge mode in which the evaporative fuel in the fuel tank 5 is purged to the throttle body 2 without involving the canister 11 (Step S16). As a result of starting the direct purge mode, the concentration of oxygen included in the exhaust air is reduced. Subsequently, whether or not the concentration of oxygen is increased is determined again in order to determine the fact that the evaporative fuel in the fuel tank 5 has become small (Step S17). When it is determined that the concentration of oxygen has increased as a result of determination (Yes in Step S17), the amount of injection of the injector 4 is increased by an amount of reduction of the evaporative fuel by the direct purge (Step S18), and the normal fuel injection control on the basis of the result of detection of the $O_2$ sensor 19 is preformed.

In other words, while the internal combustion engine E is in operation, the evaporative fuel generated in the fuel tank 5 is constantly purged to the throttle body 2. Then, whether or not the ignition in the ON state has turned OFF is determined (Step S19) and, when it is determined that the ignition has turned OFF, the internal combustion engine E is brought into a stopped state, and hence the purge from both of the fuel tank 5 and the canister 11 is terminated (purge OFF) (Step S20).

Figure 3:
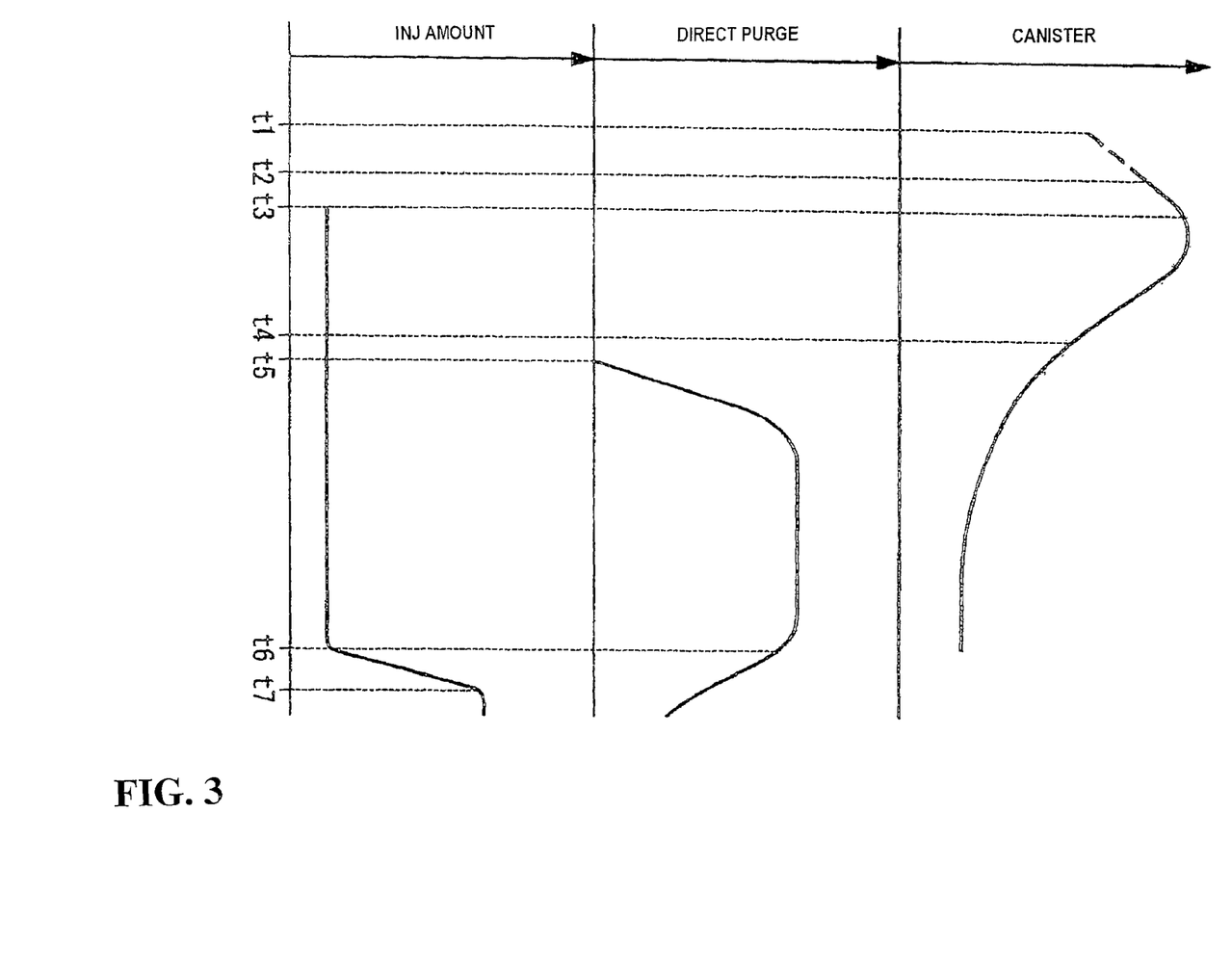
FIG. 3 is a timing chart showing timing of execution of a purge mode and a direct purge mode by the evaporative fuel treatment apparatus.

Subsequently, transition of the amount of storage of the evaporative fuel in the canister 11, the amount of purge of the evaporative fuel in the fuel tank 5, and the amount of injection by the injector 4 will be described with reference to FIG. 3 and Table 1 shown below. The lateral axis of FIG. 3 is a common time axis for each of these amounts.

When the operation of the internal combustion engine E is stopped at a time t1, the evaporative fuel in the fuel tank 5 is increased. When a predetermined pressure is reached, the two-way valve 12 of the charge channel 10 is opened, and the evaporative fuel in the fuel tank 5 is introduced into the canister 11. Accordingly, the amount of storage of the evaporative fuel in the canister 11 is gradually increased, and a time t2 immediately before the ignition is turned ON is reached. Subsequently, when the ignition is turned ON and the internal combustion engine E is operated at a time t3, the injection of the fuel by the injector 4 is started and the purge (purge mode) from the canister 11 is started. At this time, the amount of fuel injection of the injector 4 is a relatively smaller amount of injection of fuel reduced by an amount corresponding to the purged amount.

Subsequently, when the amount of storage in the canister 11 is reduced gradually by the purge, and the concentration of oxygen in the exhaust air is increased to a level higher than the predetermined concentration at a time t4, the evaporative fuel in the canister 11 has almost run down, and hence the purge from the fuel tank 5 (direct purge mode) is started at a time t5. Then, the evaporative fuel from the fuel tank 5 rises relatively precipitously. Subsequently, when the predetermined time according to the evaporative fuel in the fuel tank 5 has elapsed, the evaporative fuel in the fuel tank 5 starts to be decreased. Then, when the fuel tank 5 is brought into a state in which the evaporative fuel therein has almost run down and the concentration of oxygen in the exhaust air is increased to a level higher than the predetermined concentration at a time t6, the amount of fuel injection of the injector 4 is increased according to the increase in the concentration of oxygen. Then, at a time t7, the internal combustion engine E is brought into a state of being operated almost only by the injection of fuel by the injector 4. In the following table, a state in which the evaporative fuel in the canister 11 has almost run down and a state in which the evaporative fuel in the fuel tank 5 has almost run down are indicated as "empty".

TABLE 1

|    | IG  | $O_2$  | INJ   | Direct purge | canister |
|----|-----|--------|-------|--------------|----------|
| t2 | OFF | OFF    | OFF   | OFF          | large    |
| t3 | ON  | medium | small | OFF          | purge    |
| t4 | ON  | large  | small | OFF          | empty    |
| t5 | ON  | medium | small | ON           | empty    |
| t6 | ON  | large  | small | Empty        | empty    |
| t7 | ON  | medium | large | Empty        | empty    |

Therefore, according to the evaporative fuel treatment apparatus in the embodiment described above, with the provision of the direct purge mode in which the evaporative fuel in the fuel tank 5 is purged to the throttle body 2 in the internal combustion engine E in addition to the purge mode in which the evaporative fuel adsorbed in the canister 11 is purged to the throttle body 2 of the internal combustion engine E, volatile components of the fuel stored in the fuel tank 5 can be purged during the operation of the internal combustion engine E to reduce the volatile components in the fuel in the fuel tank 5, thereby reducing the evaporative fuel generating when the internal combustion engine E is not in operation such as while the vehicle is parked, so that the increase in the size of the canister 11 can be inhibited.

Also, since the evaporative fuel stored in the fuel tank 5 can be purged to the throttle body 2 of the internal combustion engine E directly by the direct purge mode without involving the canister 11, the change in concentration of the evaporative fuel when the canister 11 is involved in the purge mode can be evened out by the evaporative fuel in the direct purge. Therefore, the evaporative fuel in the fuel tank 5 can be purged without performing a complex correction.

Furthermore, by switching the mode between the purge mode and the direct purge mode on the basis of the results of detection obtained by the vehicle speed sensor 20 and the $O_2$ sensor 19, the evaporative fuel in the canister 11 and the fuel tank 5 can be purged to the throttle body 2 without performing the complex control in comparison with the case where all the evaporative fuel is purged via the canister 11.

Then, since the evaporative fuel in the fuel tank 5 is purged during the travel, the evaporative fuel in the fuel tank 5 generated when the vehicle is parked or the like can be reduced, so that the canister 11 can be reduced in size.

Also, since the evaporative fuel in the fuel tank 5 can be supplied to the throttle body 2 via the charge channel 10, the direct purge channel 16, and the purge channel 14, the length of the channel for the purge can be reduced, and hence the weight reduction is achieved.

The invention is not limited to the configurations of the embodiment described above, and may be modified in design without departing the scope of the invention.

For example, the saddle-type electro vehicle includes general vehicles which allow riders to ride by straddling the vehicle body, and includes not only motorcycles (including motor-assisted cycles and scooter-type vehicles), but also three-wheeler vehicles (including vehicles having two front wheels and one rear wheel in addition to vehicles having one front wheel and two rear wheels) and four-wheeler vehicles.

Figure 4:
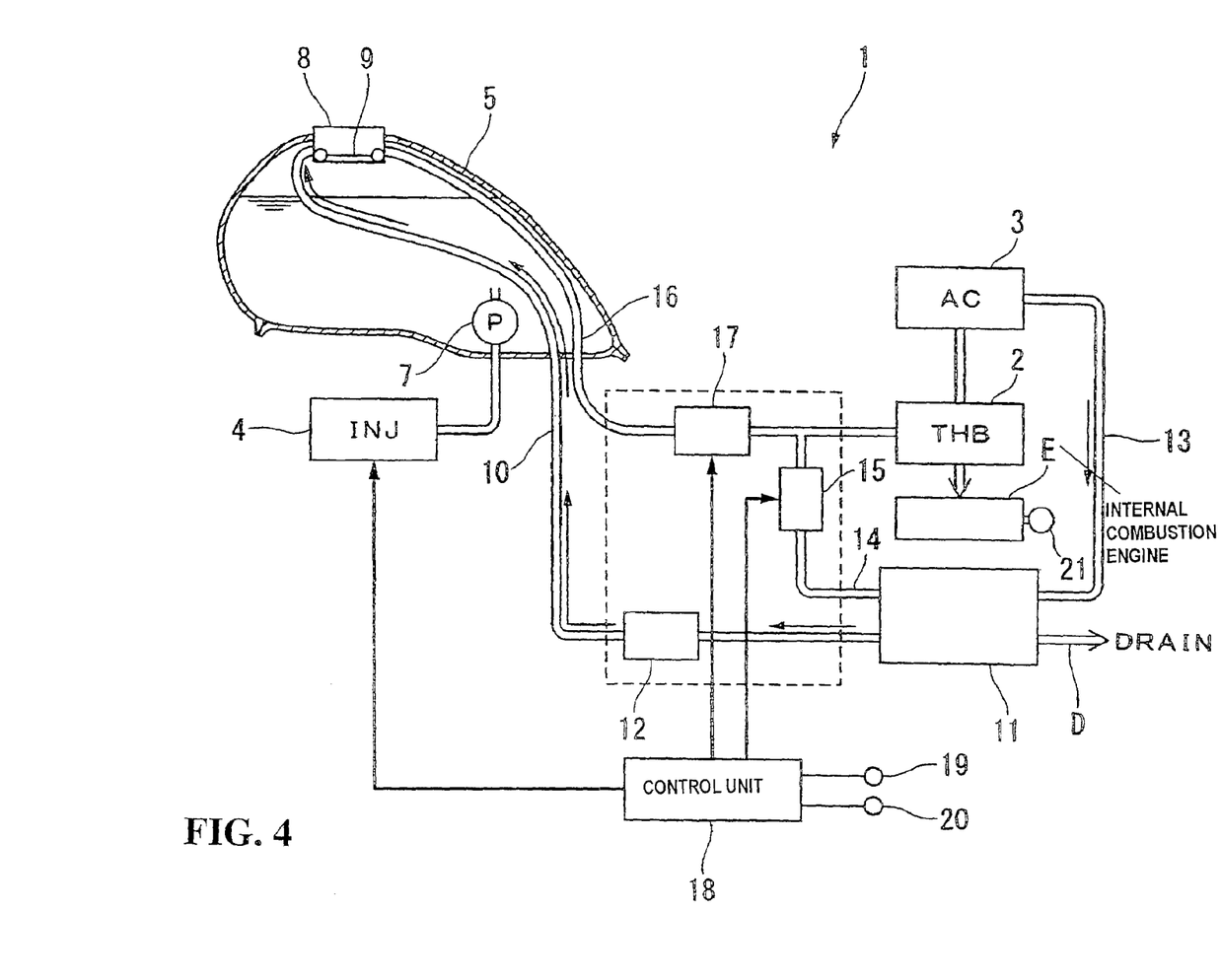
FIG. 4 is a schematic configuration drawing corresponding to FIG. 1 according to a modification of the embodiment described above.

In the embodiment described above, the case where one end of the direct purge channel 16 is branched and connected to the charge channel 10 has been described. However, the invention is not limited to this configuration and, for example, as shown in FIG. 4, one end of the direct purge channel 16 may be connected to the gas-phase portion of the vapor-liquid separating means 9. In this configuration, as shown by arrows in FIG. 4, air to be taken from the atmospheric air release channel 13 can be supplied to the gas-phase portion of the fuel tank 5 via the charge channel 10, so that more evaporative fuel can be purged to the throttle body 2 by causing the volatile components of the fuel in the fuel tank 5 to be evaporated more positively, the evaporative fuel generating when the internal combustion engine E is not in operation such as while the vehicle is parked can be reduced, and hence further reduction in the size of the canister 11 is enabled.

In addition, in the embodiment described above, although the case where the stable combustion of the internal combustion engine E is determined on the basis of the result of detection obtained by the vehicle speed sensor 20 has been described, the invention is not limited to this configuration. For example, the internal combustion engine E may be determined to be under the stable combustion when the temperature of coolant reaches a predetermined temperature set in advance on the basis of the result of detection obtained by a temperature sensor 21 (see FIG. 1 and FIG. 4) which monitors the temperature of the coolant for cooling the internal combustion engine E.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An evaporative fuel treatment apparatus for a vehicle having a fuel tank configured to store fuel therein, comprising:
   a canister having an absorbent filled therein and configured to adsorb and store the evaporative fuel;
   a charge channel configured to provide communication between the fuel tank and the canister;
   a purge channel configured to provide communication between the canister and an air-intake system of an internal combustion engine;
   an atmospheric air release channel connected to the canister to enable the canister to communicate with an outside, the apparatus further comprising:
   a direct purge channel capable of supplying the evaporative fuel from the fuel tank to the purge channel without involving the canister;
   a purge control valve provided in the purge channel and configured to control a communicating state between the canister and the air-intake system of the internal combustion engine by an opening and closing operation;
   a direct purge control valve provided in the direct purge channel and configured to control the communicating state between the fuel tank and the air-intake system of the internal combustion engine by an opening and closing operation; and
   a two-way valve provided in the charge channel and configured to open at a predetermined pressure,
   the evaporative fuel treatment apparatus further comprising:
   a purge mode in which the evaporative fuel adsorbed in the canister is purged to the air-intake system of the internal combustion engine by bringing the direct purge control valve into a closed state and the purge control valve into an opened state while the internal combustion engine is in operation, and
   a direct purge mode in which the evaporative fuel in the fuel tank is purged to the air-intake system by bringing the purge control valve into a closed state and the direct purge control valve into the opened state.

2. The evaporative fuel treatment apparatus for a vehicle according to claim 1, further comprising:
   an $O_2$ sensor mounted on an exhaust system of the internal combustion engine and configured to detect a concentration of oxygen in exhaust air;
   an injector configured to inject the fuel supplied from the fuel tank;
   a vehicle speed sensor configured to detect the vehicle speed; and
   a control unit configured to determine different amounts of injection of the injector based on a result of one or more detections of the $O_2$ sensor and the vehicle speed sensor,
   wherein the control unit is configured to start the purge mode when the internal combustion engine is activated and a predetermined vehicle speed is reached,
   reduce the amount of injection of the injector based on the result of a first detection obtained by the $O_2$ sensor simultaneously with the start of the purge mode,
   start the direct purge mode when the concentration of oxygen is determined to be in excess of a predetermined concentration based on the result of a second detection obtained by the $O_2$ sensor,
   determine that the purge by the canister and the direct purge by the evaporative fuel in the fuel tank are completed when the concentration of oxygen becomes in excess of the predetermined concentration again thereafter, and increase the amount of injection of the injector based on a result of a third detection obtained by the $O_2$ sensor.

3. The evaporative fuel treatment apparatus for a vehicle according to claim 1, comprising:
- an $O_2$ sensor mounted on an exhaust system of the internal combustion engine and configured to detect the concentration of oxygen in exhaust air;
- an injector configured to inject the fuel supplied from the fuel tank;
- a temperature sensor configured to detect the temperature of coolant for cooling the internal combustion engine; and
- a control unit configured to determine an amount of injection of the injector based on a result of one or more detections of the $O_2$ sensor and the temperature sensor,
- wherein the control unit is configured to start the purge mode when the internal combustion engine is activated and the temperature of the coolant reaches a predetermined temperature,
- reduce the amount of injection of the injector based the result of a first detection obtained by the $O_2$ sensor simultaneously with the start of the purge mode,
- start the direct purge mode when the concentration of oxygen is determined to be in excess of the predetermined concentration based on the result of a second detection obtained by the $O_2$ sensor,
- determine that the purge by the canister and the direct purge by the evaporative fuel in the fuel tank are completed when the concentration of oxygen becomes in excess of the predetermined concentration again thereafter, and
- increase the amount of injection of the injector based on the result of a third detection obtained by the $O_2$ sensor.

4. The evaporative fuel treatment apparatus for a vehicle according to claim 1, wherein the direct purge channel is branched from the charge channel on a side of the fuel tank with respect to the two-way valve, and is merged with the purge channel on a side of the air-intake system of the internal combustion engine with respect to the purge control valve.

5. The evaporative fuel treatment apparatus for a vehicle according to claim 2, wherein the direct purge channel is branched from the charge channel on a side of the fuel tank with respect to the two-way valve, and is merged with the purge channel on a side of the air-intake system of the internal combustion engine with respect to the purge control valve.

6. The evaporative fuel treatment apparatus for a vehicle according to claim 3, wherein the direct purge channel is branched from the charge channel on a side of the fuel tank with respect to the two-way valve, and is merged with the purge channel on a side of the air-intake system of the internal combustion engine with respect to the purge control valve.

7. The evaporative fuel treatment apparatus for a vehicle according to claim 1, wherein the direct purge channel is merged and connected with the purge channel from a gas-phase portion of a vapor-liquid separating device in the fuel tank.

8. The evaporative fuel treatment apparatus for a vehicle according to claim 2, wherein the direct purge channel is merged and connected with the purge channel from a gas-phase portion of a vapor-liquid separating device in the fuel tank.

9. The evaporative fuel treatment apparatus for a vehicle according to claim 3, wherein the direct purge channel is merged and connected with the purge channel from a gas-phase portion of a vapor-liquid separating device in the fuel tank.

10. The evaporative fuel treatment apparatus for a vehicle according to claim 1, wherein the direct purge channel extends between a gas-phase portion of a vapor-liquid separating device in the fuel tank and the direct purge control valve, and
- the charge channel extend between the gas-phase portion of a vapor-liquid separating device in the fuel tank and the two way valve.

11. An evaporative fuel treatment apparatus for a vehicle having a fuel tank configured to store fuel therein, comprising:
- a canister having an absorbent filled therein and configured to adsorb and store the evaporative fuel;
- a charge channel extending between the fuel tank and the canister;
- a purge channel extending between the canister and a throttle body of an air-intake system of an internal combustion engine;
- an atmospheric air release channel connected between the canister and an air cleaner box to enable the canister to communicate with an outside, the apparatus further comprising:
- a direct purge channel capable of supplying the evaporative fuel from the fuel tank to the purge channel without involving the canister;
- a purge control valve provided in the purge channel and configured to control a communicating state between the canister and the throttle body of the air-intake system by an opening and closing operation;
- a direct purge control valve provided in the direct purge channel and configured to control the communicating state between the fuel tank and the throttle body of the air-intake system by an opening and closing operation; and
- a two-way valve provided in the charge channel and configured to open at a predetermined pressure,
- the evaporative fuel treatment apparatus further comprising:
- a purge mode in which the evaporative fuel adsorbed in the canister is purged to the air-intake system of the internal combustion engine by bringing the direct purge control valve into a closed state and the purge control valve into an opened state while the internal combustion engine is in operation, and
- a direct purge mode in which the evaporative fuel in the fuel tank is purged to the air-intake system by bringing the purge control valve into a closed state and the direct purge control valve into the opened state.

12. The evaporative fuel treatment apparatus for a vehicle according to claim 11, further comprising:
- an $O_2$ sensor mounted on an exhaust system of the internal combustion engine and configured to detect a concentration of oxygen in exhaust air;
- an injector configured to inject the fuel supplied from the fuel tank;
- a vehicle speed sensor configured to detect the vehicle speed; and
- a control unit configured to determine an amount of injection of the injector based on a result of one or more detections of the $O_2$ sensor and the vehicle speed sensor,
- wherein the control unit is configured to start the purge mode when the internal combustion engine is activated and a predetermined vehicle speed is reached,
- reduce the amount of injection of the injector based on the result of a first detection obtained by the $O_2$ sensor simultaneously with the start of the purge mode, start the direct purge mode when the concentration of oxygen is determined to be in excess of a predetermined concentration based on the result of a second detection obtained by the O$_2$ sensor, determine that the purge by the canister and the direct purge by the evaporative fuel in the fuel tank are completed when the concentration of oxygen becomes in excess of the predetermined concentration again thereafter, and increase the amount of injection of the injector based on the result of a third detection obtained by the O$_2$ sensor.

13. The evaporative fuel treatment apparatus for a vehicle according to claim 11, comprising:

an O$_2$ sensor mounted on an exhaust system of the internal combustion engine and configured to detect the concentration of oxygen in exhaust air;

an injector configured to inject the fuel supplied from the fuel tank;

a temperature sensor configured to detect the temperature of coolant for cooling the internal combustion engine; and a control unit configured to determine an amount of injection of the injector based on a result of one or more detections of the O$_2$ sensor and the temperature sensor, wherein the control unit is configured to start the purge mode when the internal combustion engine is activated and the temperature of the coolant reaches a predetermined temperature, reduce the amount of injection of the injector based the result of a first detection obtained by the O$_2$ sensor simultaneously with the start of the purge mode, start the direct purge mode when the concentration of oxygen is determined to be in excess of the predetermined concentration based on the result of a second detection obtained by the O$_2$ sensor, determine that the purge by the canister and the direct purge by the evaporative fuel in the fuel tank are completed when the concentration of oxygen becomes in excess of the predetermined concentration again thereafter, and increase the amount of injection of the injector based on the result of a third detection obtained by the O$_2$ sensor.

14. The evaporative fuel treatment apparatus for a vehicle according to claim 11, wherein the direct purge channel is branched from the charge channel on a side of the fuel tank with respect to the two-way valve, and is merged with the purge channel on a side of the air-intake system of the internal combustion engine with respect to the purge control valve.

15. The evaporative fuel treatment apparatus for a vehicle according to claim 12, wherein the direct purge channel is branched from the charge channel on a side of the fuel tank with respect to the two-way valve, and is merged with the purge channel on a side of the air-intake system of the internal combustion engine with respect to the purge control valve.

16. The evaporative fuel treatment apparatus for a vehicle according to claim 13, wherein the direct purge channel is branched from the charge channel on a side of the fuel tank with respect to the two-way valve, and is merged with the purge channel on a side of the air-intake system of the internal combustion engine with respect to the purge control valve.

17. The evaporative fuel treatment apparatus for a vehicle according to claim 11, wherein the direct purge channel is merged and connected with the purge channel from a gas-phase portion of a vapor-liquid separating device in the fuel tank.

18. The evaporative fuel treatment apparatus for a vehicle according to claim 12, wherein the direct purge channel is merged and connected with the purge channel from a gas-phase portion of a vapor-liquid separating device in the fuel tank.

19. The evaporative fuel treatment apparatus for a vehicle according to claim 13, wherein the direct purge channel is merged and connected with the purge channel from a gas-phase portion of a vapor-liquid separating device in the fuel tank.

20. The evaporative fuel treatment apparatus for a vehicle according to claim 11, wherein the direct purge channel extends between a gas-phase portion of a vapor-liquid separating device in the fuel tank and the direct purge control valve, and the charge channel extend between the gas-phase portion of a vapor-liquid separating device in the fuel tank and the two way valve.

* * * * *